(12) United States Patent
Miyazaki

(10) Patent No.: US 8,605,315 B2
(45) Date of Patent: Dec. 10, 2013

(54) PRINT DATA CONVERSION PROCESSING

(75) Inventor: Koichi Miyazaki, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 352 days.

(21) Appl. No.: 13/084,019

(22) Filed: Apr. 11, 2011

(65) Prior Publication Data

US 2012/0099141 A1    Apr. 26, 2012

(30) Foreign Application Priority Data

Oct. 26, 2010    (JP) ................................ 2010-239487

(51) Int. Cl.
*G06F 15/00* (2006.01)
*G06F 3/12* (2006.01)
*G06K 1/00* (2006.01)

(52) U.S. Cl.
USPC ........................................ 358/1.15; 358/1.13

(58) Field of Classification Search
None
See application file for complete search history.

(56) References Cited

U.S. PATENT DOCUMENTS

| | | |
|---|---|---|
| 7,423,783 B2 | 9/2008 | Yamaguchi |
| 2003/0095282 A1 | 5/2003 | Suzuki et al. |
| 2007/0070375 A1* | 3/2007 | Owen ........................ 358/1.13 |
| 2007/0195353 A1* | 8/2007 | Tsunoda .................... 358/1.13 |
| 2009/0141053 A1* | 6/2009 | Dahlgren ........................ 347/3 |

FOREIGN PATENT DOCUMENTS

| | | |
|---|---|---|
| JP | A 5-201077 | 8/1993 |
| JP | A 2007-320138 | 12/2007 |
| JP | A 2008-193356 | 8/2008 |
| JP | A 2009-208360 | 9/2009 |

OTHER PUBLICATIONS

Jun. 28, 2012 Office Action issued in Australian Patent Application No. 2011201936.

* cited by examiner

*Primary Examiner* — Douglas Tran
(74) *Attorney, Agent, or Firm* — Oliff & Berridge, PLC.

(57) ABSTRACT

An image processing device includes plural conversion units that convert a print document into raster data, a determination unit that determines the number of conversion units to be operated on the basis of the number of pages of an obtained print document, and a control unit that performs control so that only conversion units corresponding to the number determined by the determination unit among the plural conversion units are operated.

4 Claims, 11 Drawing Sheets

FIG. 9
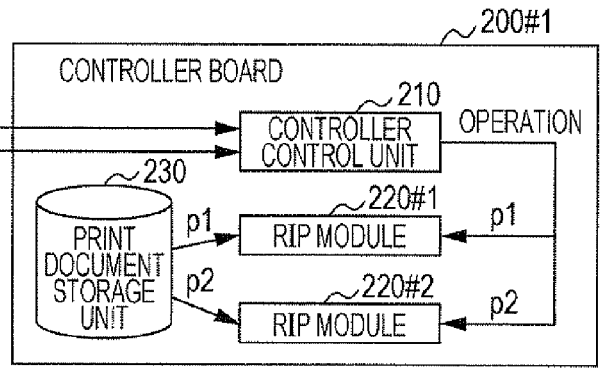
- NUMBER OF RIP MODULES = 2
- PAGE ASSIGNMENT = p1, p2
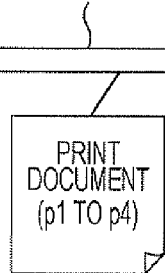
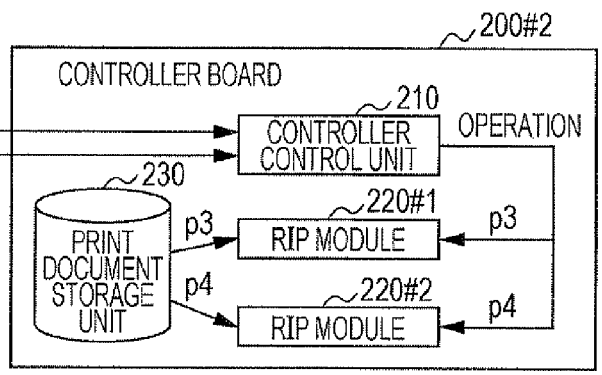
- NUMBER OF RIP MODULES = 2
- PAGE ASSIGNMENT = p3, p4
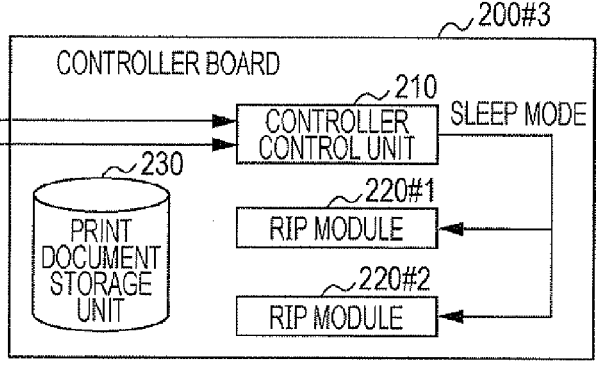
SLEEP MODE SHIFT INSTRUCTION
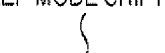
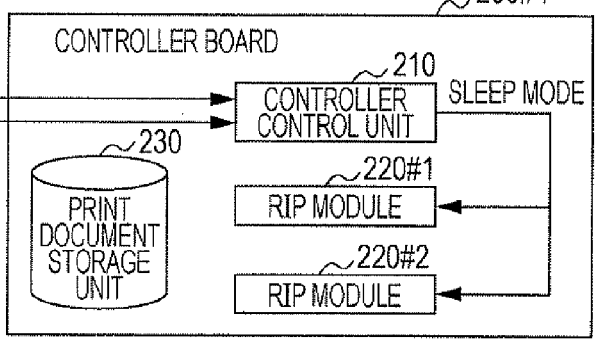
SLEEP MODE SHIFT INSTRUCTION
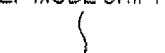

FIG. 10
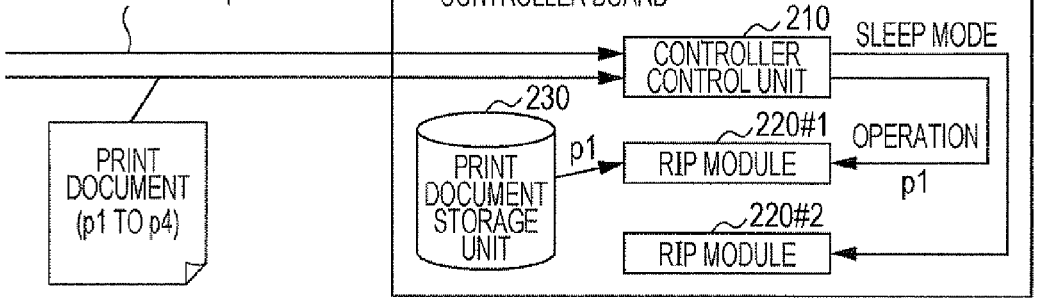
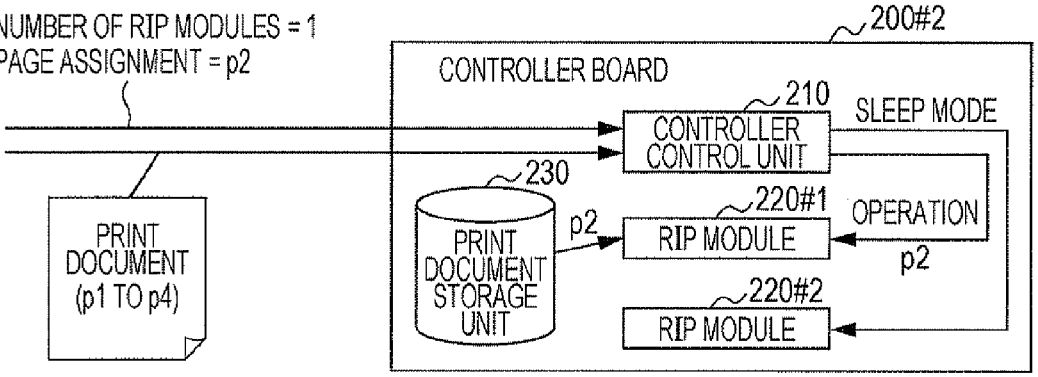
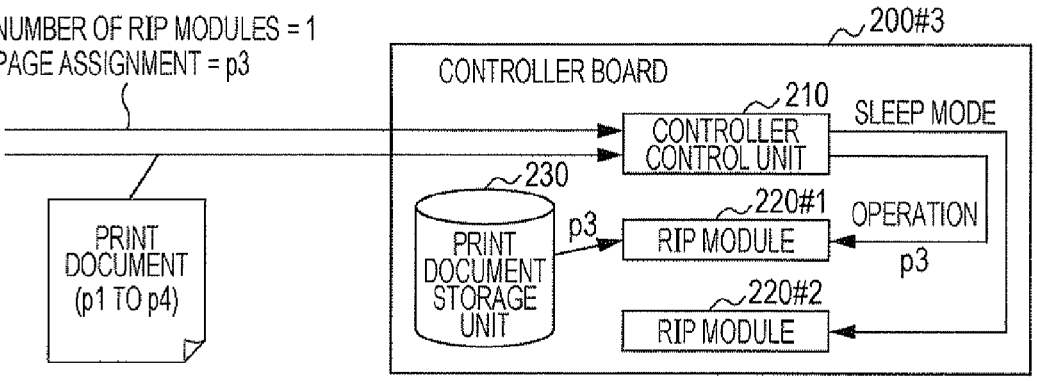
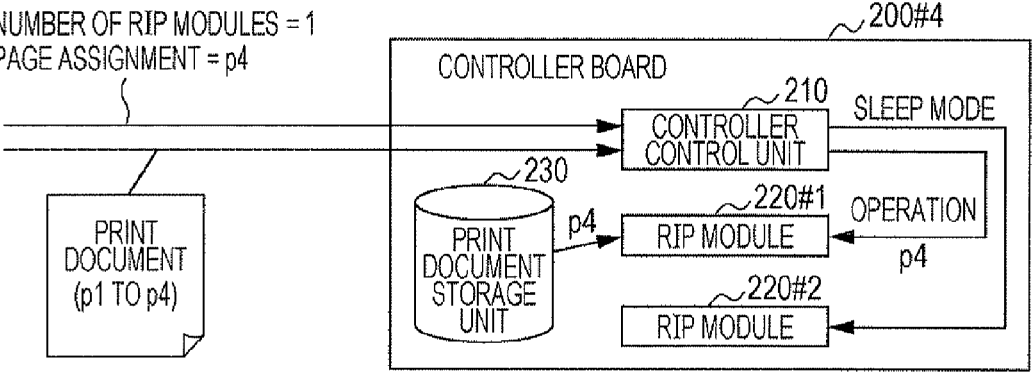

FIG. 11
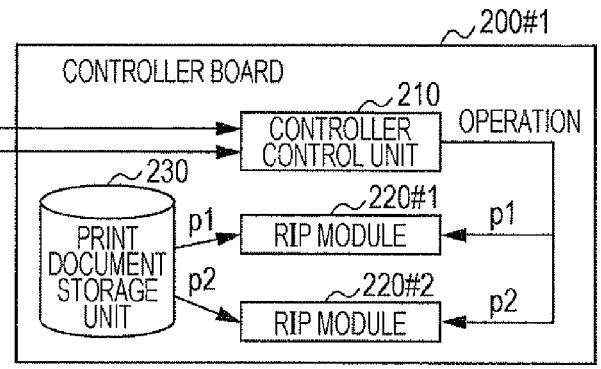
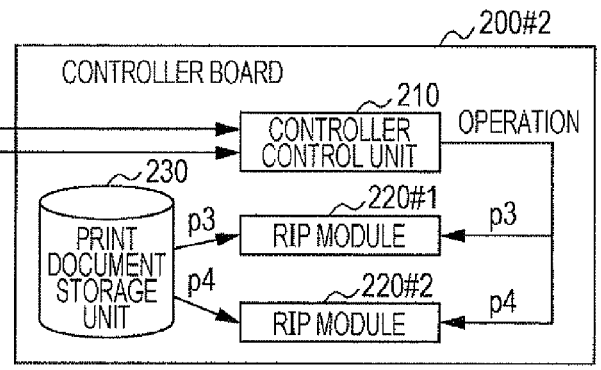
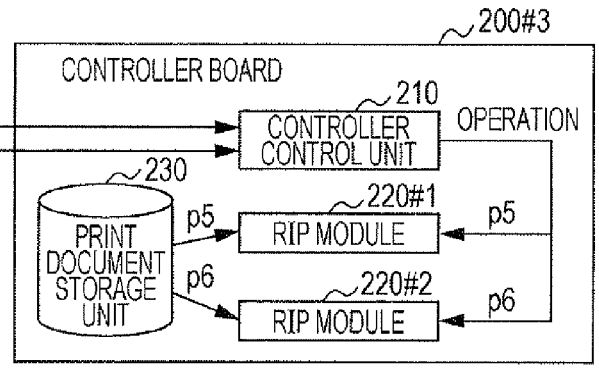
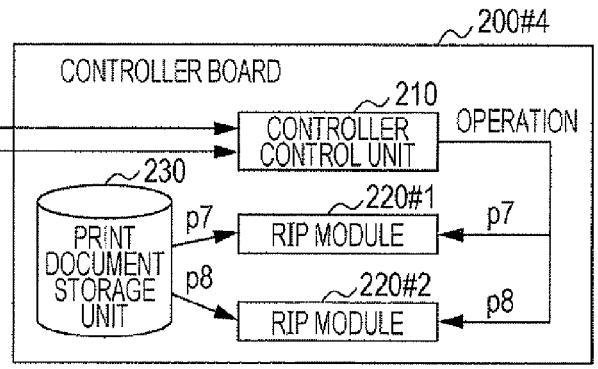

PRINT DATA CONVERSION PROCESSING

CROSS-REFERENCE TO RELATED APPLICATIONS

This application is based on and claims priority under 35 USC 119 from Japanese Patent Application No. 2010-239487 filed Oct. 26, 2010.

BACKGROUND (i) Technical Field

The present invention relates to an image processing device, an image output apparatus, and a computer readable medium storing a program.

(ii) Related Art

In some image forming devices, a control unit such as a central processing unit (CPU) or a microprocessor unit (MPU) executes a module serving as software for generating raster data from a print document described in a page description language (PDL), thereby generating raster data from the print document.

Such an image forming device is provided with plural controllers, each having a single control unit (CPU or MPU), and the control units of the respective controllers execute the module, thereby performing parallel processing of generating the raster data from the print document.

SUMMARY

According to an aspect of the invention, there is provided an image processing device including: plural conversion units that convert a print document into raster data; a determination unit that determines the number of conversion units to be operated on the basis of the number of pages of an obtained print document; and a control unit that performs control so that only conversion units corresponding to the number determined by the determination unit among the plural conversion units are operated.

BRIEF DESCRIPTION OF THE DRAWINGS

Exemplary embodiment(s) of the present invention will be described in detail based on the following figures, wherein:

FIG. 9 is a diagram describing a first specific example of a RIP process performed by the print data conversion processing device according to the exemplary embodiment;

FIG. 10 is a diagram describing a second specific example of a RIP process performed by the print data conversion processing device according to the exemplary embodiment; and FIG. 11 is a diagram describing a third specific example of a RIP process performed by the print data conversion processing device according to the exemplary embodiment.

DETAILED DESCRIPTION

Figure 1:
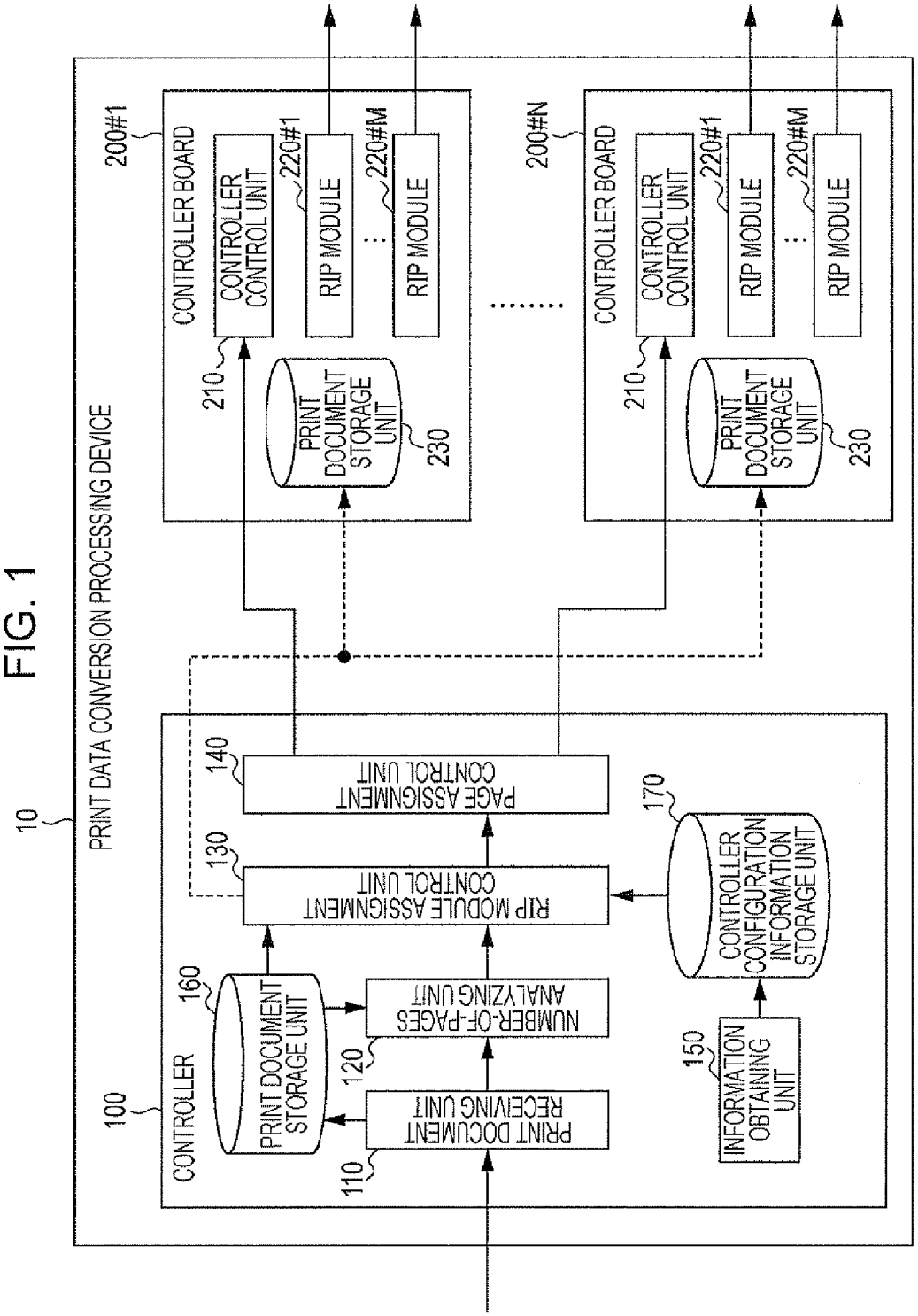
FIG. 1 is a block diagram illustrating the functional configuration of a print data conversion processing device according to an exemplary embodiment of the present invention.

Hereinafter, an exemplary embodiment of the present invention will be described in detail with reference to the drawings. In the drawings describing the exemplary embodiment, the same elements are basically denoted by the same reference numerals, and repeated description thereof will be omitted.

The functional configuration of a print data conversion processing device 10 according to the exemplary embodiment will be described with reference to FIG. 1.

As illustrated in FIG. 1, the print data conversion processing device 10 serving as an image processing device includes a controller 100 and plural (N) controller boards 200#1 to 200#N.

The controller 100 includes a print document receiving unit 110, a number-of-pages analyzing unit 120, a raster image processor (RIP) module assignment control unit 130, a page assignment control unit 140, an information obtaining unit 150, a print document storage unit 160, and a controller configuration information storage unit 170.

The print document receiving unit 110 receives, on the basis of communication protocol information, a print document that is transmitted from an external host computer and that is described in a page description language (PDL), and stores the received print document in the print document storage unit 160.

The number-of-pages analyzing unit 120 detects the number of pages forming the print document stored in the print document storage unit 160 and notifies the RIP module assignment control unit 130 of a detection result (the number of pages of the print document).

The RIP module assignment control unit 130 determines which controller boards are to be operated and the number of RIP modules on the basis of the notified number of pages of the print document and the controller configuration information stored in the controller configuration information storage unit 170, and outputs the pieces of information representing the determined controller boards to be operated, the number of RIP modules, and the number of pages of the print document to the page assignment control unit 140.

That is, the RIP module assignment control unit 130 is configured to determine the number of RIP modules (conversion units) to be operated on the basis of the obtained number of pages of the print document, and particularly determines the number of RIP modules to be operated, corresponding to the number of pages of the print document.

Here, "operation" means not only activation of an RIP module but also continuation of an activated state.

Also, the RIP module assignment control unit 130 performs control so that only the determined number of RIP modules among the plural RIP modules operate. In this case, the RIP module assignment control unit 130 performs control so that only the determined number of RIP modules among all the RIP modules operate so as to maximize the number of controller boards (control boards) in an idling state among the plural controller boards.

Also, the RIP module assignment control unit 130 transfers the print document stored in the print document storage unit 160 to the determined controller boards to be operated.

The page assignment control unit 140 outputs, to the controller boards to be operated, the number of RIP modules to be operated on the respective controller boards and page assignment information (information about the pages to be printed), on the basis of the pieces of information representing the controller boards to be operated, the number of RIP modules, and the number of pages of the print document notified from the RIP module assignment control unit 130.

Also, the page assignment control unit 140 outputs a sleep mode shift instruction to a controller board not to be operated.

The information obtaining unit 150 obtains controller configuration information and stores the obtained controller configuration information in the controller configuration information storage unit 170. Here, the controller configuration information includes the pieces of information (identification information) representing controller boards, the number of the controller boards, and the number of RIP modules to be operated on each controller board.

The following three methods may be used by the information obtaining unit 150 to obtain controller configuration information.

(1) The information obtaining unit 150 obtains, as the controller configuration information, system configuration information that is input by a user via a user interface (not illustrated), such as an input/output device or an operation panel. The system configuration information includes the pieces of information (identification information) representing controller boards, the number of the controller boards, and the number of RIP modules to be operated on each controller board.

(2) The information obtaining unit 150 queries individual controller boards about the RIP processing ability (the number of RIP modules) and obtains responses to the inquiry from the individual controller boards. Then, the information obtaining unit 150 obtains, as the controller configuration information, the pieces of information (identification information) representing the controller boards that have responded to the inquiry, the number of the controller boards, and the numbers of RIP modules, which are the responses to the inquiry from the respective controller boards.

(3) The information obtaining unit 150 queries individual controller boards about the number of CPUs mounted on the controller board and the storage capacity of a memory, and obtains responses to the inquiry from the individual controller boards. Then, on the basis of the responses to the inquiry from the controller boards (the numbers of CPUs and the storage capacities of memories), the information obtaining unit 150 determines the number of controller boards that have responded to the inquiry and the maximum number of RIP modules to be operated on each of the controller boards. Then, the information obtaining unit 150 obtains, as the controller configuration information, the pieces of information (identification information) representing the controller boards that have responded to the inquiry, the determined number of controller boards, and the maximum number of RIP modules of each controller board.

In the case of the foregoing method (3), the information obtaining unit 150 determines the maximum number of RIP modules to be operated on each controller board in accordance with the attribute of the print document described in a page description language (hereinafter "PDL"), that is, in accordance with the type of PDL of the print document. This is because the program size of a software module (program) serving as a RIP module, and the memory size of a work memory (storage area in a local memory) for storing an intermediate result and a final result of the execution of the program vary in accordance with the type of PDL, and thus the number of RIP modules to be operated among actual plural RIP modules varies among individual controller boards.

The print document storage unit 160 stores the print document received by the print document receiving unit 110.

The controller configuration information storage unit 170 stores the controller configuration information obtained by the information obtaining unit 150.

Each of the plural controller boards 200#1 to 200#N includes a controller control unit 210, plural (M) RIP modules 220#1 to 220#M, and a print document storage unit 230. The number of RIP modules on each controller board is not necessarily the same, and may be different. In this exemplary embodiment, the number of RIP modules on each controller board is the same.

The controller control unit 210 obtains a print document transferred from the RIP module assignment control unit 130 and stores the print document in the print document storage unit 230.

Also, the controller control unit 210 obtains output information output from the page assignment control unit 140 and performs a process on the basis of the output information. That is, when the output information includes the number of RIP modules and page assignment information, the controller control unit 210 causes only the RIP modules corresponding to the number of RIP modules to operate, and instructs the operated RIP modules to print the print pages based on the page assignment information. On the other hand, when the output information includes a sleep mode shift instruction, the controller control unit 210 causes the controller board to shift to a sleep mode.

The plural RIP modules 220#1 to 220#M convert a print document into raster data, that is, execute a RIP process on the print document.

That is, the RIP modules 220#1 to 220#M interpret the PDL description of the print document and generate raster data representing the PDL description on the basis of a result of the interpretation. Also, the RIP modules 220#1 to 220#M execute image processing, such as a color conversion process, a gradation correction process, and a screen process, on the raster data.

In this way, the RIP process is executed by the RIP modules 220#1 to 220#M, whereby raster data of individual colors: cyan (C); magenta (M); yellow (Y); and black (K), is generated for the individual pages of the print document. Accordingly, the raster data of the colors CMYK of the individual pages is output as print pages from the controller board to a print control device 20.

The print document storage unit 230 stores the print document obtained by the controller control unit 210.

In this exemplary embodiment, each of the print document receiving unit 110, the number-of-pages analyzing unit 120, the RIP module assignment control unit 130, the page assignment control unit 140, and the information obtaining unit 150, which are provided in the controller 100, is constituted by software (software module) for realizing the function of the corresponding element. Also, the controller control unit 210 and each of the plural RIP modules 220#1 to 220#M provided on each of the controller boards 200#1 to 200#N is constituted by software (software module) for realizing the function of the corresponding element.

In this exemplary embodiment, the plural RIP modules 220#1 to 220#M of the plural controller boards 200#1 to 200#N correspond to plural conversion units and have a conversion function. The RIP module assignment control unit 130 of the controller 100 corresponds to a determination unit and a control unit, and has a determination function and a control function. The plural controller boards 200#1 to 200#N correspond to plural control boards.

Next, the functional configuration of an image output apparatus 1 including the above-described print data conversion processing device 10 will be described with reference to FIG. 2.

Figure 2:
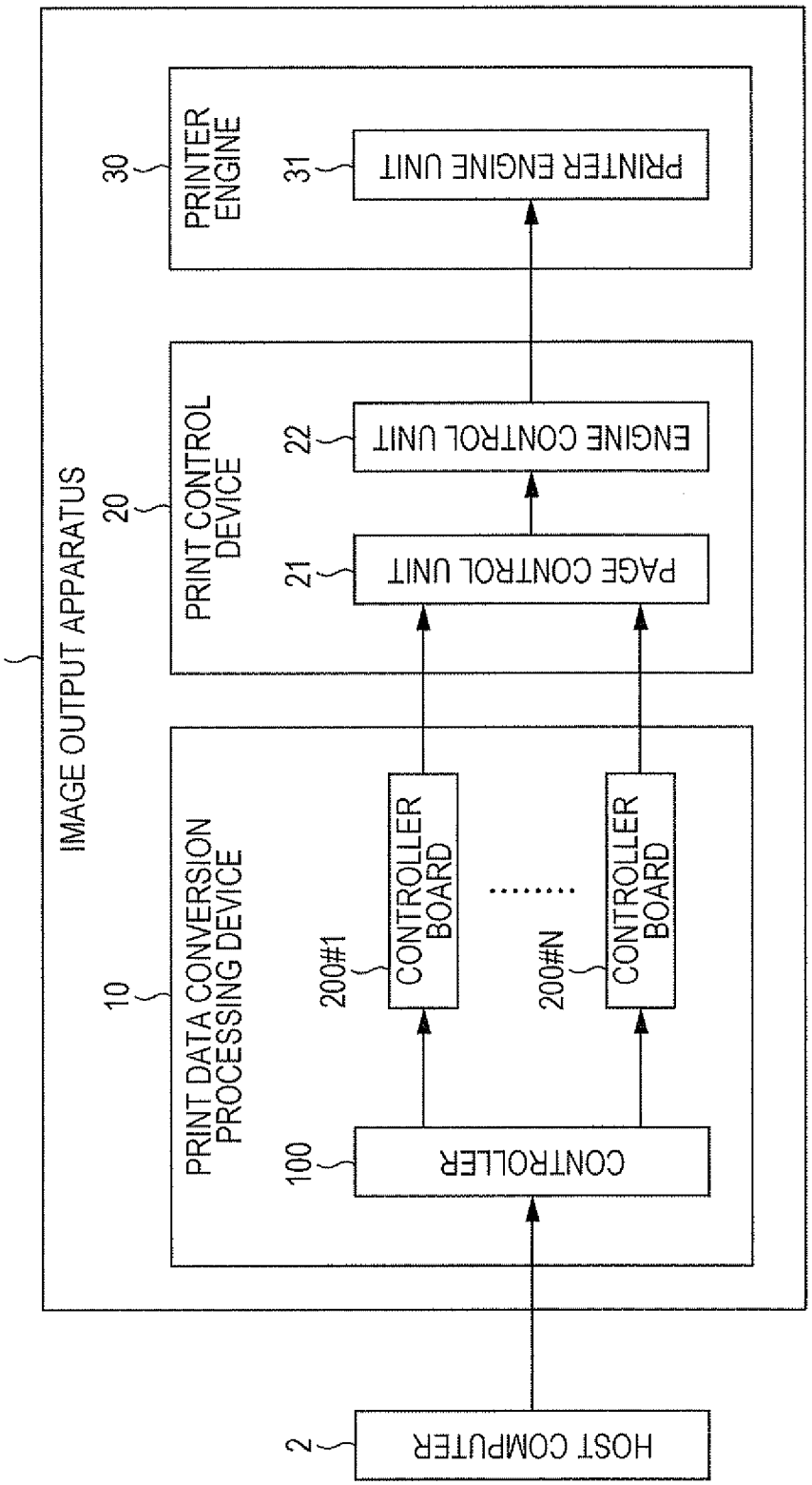
FIG. 2 is a block diagram illustrating the functional configuration of an image output apparatus including the print data conversion processing device according to the exemplary embodiment.

As illustrated in FIG. 2, the image output apparatus 1 includes the above-described print data conversion processing device 10, the print control device 20, and a printer engine 30.

As described above, the print data conversion processing device 10 executes a RIP process on a print document supplied from a host computer 2, and outputs a result of the RIP process, that is, the raster data of the colors CMYK of individual pages, to the print control device 20.

The print control device 20 includes a page control unit 21 and an engine control unit 22.

The page control unit 21 receives the raster data of the colors CMYK of individual pages output from the print data conversion processing device 10, manages the received print pages on the basis of page numbers, and outputs the print pages to the engine control unit 22 according to the page numbers.

Here, the raster data includes data in the form called an intermediate language, as well as data that is completely in a bitmap state, and also any data is acceptable as long as the data is generated by interpreting a PDL.

The engine control unit 22 generates video signals corresponding to the raster data according to the page numbers, that is, video signals corresponding to the respective colors CMYK, and outputs the generated video signals of the colors CMYK to the printer engine 30. An example of the video signals includes pulse signals for exposure, such as pulse-width modulation signals (PWM signals).

The printer engine 30 has a function of an execution unit, and executes image formation on the basis of the raster data generated through the conversion performed by the RIP modules (conversion units) of the print data conversion processing device 10 (image processing device), in other words, the pulse signals (video signals) of the respective colors CMYK output from the print control device 20.

Next, the hardware configuration of the image output apparatus 1 including the above-described print data conversion processing device 10 will be described with reference to FIG. 3.

Figure 3:
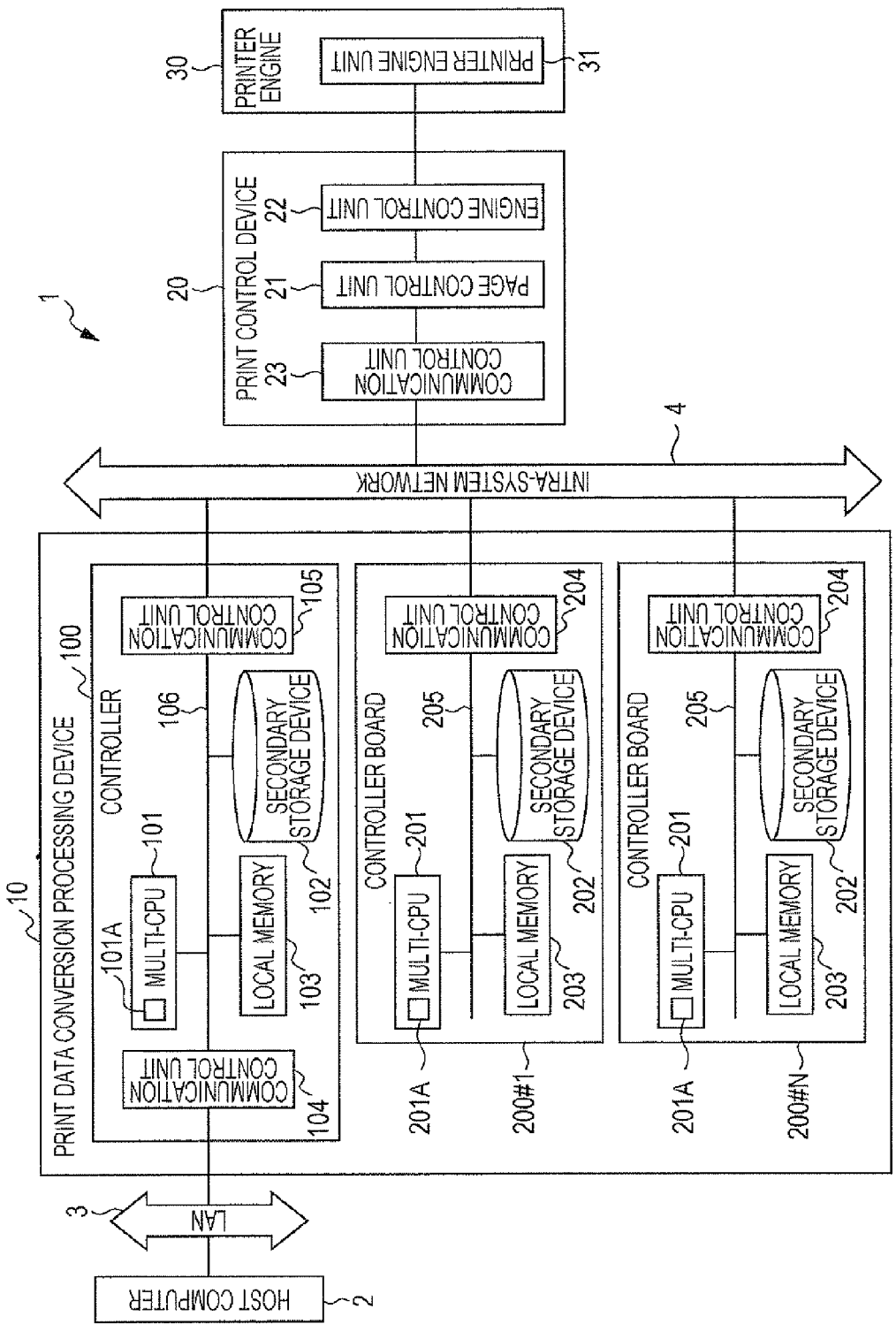
FIG. 3 is a block diagram illustrating the hardware configuration of the image output apparatus including the print data conversion processing device according to the exemplary embodiment.

As illustrated in FIG. 3, the image output apparatus 1 is connected to the host computer 2 via a local area network (LAN) 3, for example. In the image output apparatus 1, the print data conversion processing device 10 and the print control device 20 are connected to each other via a network (intra-system network) 4. Furthermore, in the print data conversion processing device 10, the controller 100 and the individual controller boards 200#1 to 200#N are connected to each other via the network 4. An example of the network 4 is a communication cable.

In the print data conversion processing device 10, the controller 100 includes a multi-CPU 101, a secondary storage device 102, a local memory 103, and plural communication control units 104 and 105. These elements 101 to 105 are connected to a local bus 106.

The secondary storage device 102 is constituted by a hard disk, an optical disc, or the like, and stores software (software modules) for realizing the respective functions of the above-described print document receiving unit 110, number-of-pages analyzing unit 120, RIP module assignment control unit 130, page assignment control unit 140, and information obtaining unit 150, communication protocol information, and a print document that is transmitted from the host computer 2 and is received by the communication control unit 104.

The local memory 103 is constituted by a random access memory (RAM) or the like, and stores the software (software modules) that is read from the secondary storage device 102 and that is for realizing the respective functions of the above-described elements 110 to 150, information about the progress of a process executed by the elements 110 to 150, and information about a final result of the process.

The information about the final result of the process may be, for example, controller configuration information, the number of pages of a print document, pieces of information representing the controller boards to be operated, the number of RIP modules of each of the controller boards to be operated, and a print document to be transferred.

The multi-CPU 101 is constituted by plural CPUs, which read the software (software modules) for realizing the respective functions of the above-described elements 110 to 150 from the secondary storage device 102 to the local memory 103, and execute the corresponding software (software modules). Accordingly, the individual functions of the above-described elements 110 to 150 are realized.

Also, the multi-CPU 101 includes a power supply 101A for supplying a power supply voltage (or power) to each of the plural CPUs.

The communication control unit 104 communicates with an external apparatus, for example, the host computer 2, under the control performed by the CPU that executes the software (software module) corresponding to the print document receiving unit 110 in the multi-CPU 101. For example, the communication control unit 104 receives a print document transmitted from the host computer 2 and supplies the print document to the corresponding CPU.

The communication control unit 105 is an interface that controls data communication based on a serial transmission scheme or parallel transmission scheme that is defined between the communication control unit 105 and the controller boards 200#1 to 200#N, and performs data communication with the individual controller boards 200#1 to 200#N.

Each of the controller boards 200#1 to 200#N includes a multi-CPU 201, a secondary storage device 202, a local memory 203, and a communication control unit 204. These elements 201 to 204 are connected to a local bus 205.

The secondary storage device 202 is constituted by a hard disk, an optical disc, or the like, and stores software (software modules) for realizing the respective functions of the controller control unit 210 and the plural RIP modules 220#1 to 220#M, and a print document that is transferred from the controller 100 and is received by the controller control unit 210.

The local memory 203 is constituted by a RAM or the like, and stores the software (software modules) that is read from the secondary storage device 202 and that is for realizing the respective functions of the above-described elements 210 and 220#1 to 220#M, information about the progress of a process executed by the elements 210 and 220#1 to 220#M, and information about a final result of the process.

The information about the final result of the process may be, for example, a print document transferred from the RIP module assignment control unit 130, output information from the page assignment control unit 140 (the number of RIP modules to be operated and page assignment information, or a sleep mode shift instruction), and a result of the RIP process (raster data of the individual colors CMYK).

The multi-CPU 201 is constituted by plural CPUs corresponding to the controller control unit 210 and the RIP modules 220#1 to 220#M. In the multi-CPU 201, the plural CPUs read the software (software modules) for realizing the respective functions of the above-described elements 210 and 220#1 to 220#M from the secondary storage device 202 to the local memory 203, and execute the corresponding software (software modules). Accordingly, the individual functions of the above-described elements 210 and 220#1 to 220#M are realized.

Also, the multi-CPU 201 includes a power supply 201A for supplying a power supply voltage (or power) to each of the plural CPUs. Each of the plural CPUs operates in an operation mode of executing a process by being supplied with a specific power supply voltage (power) or in a sleep mode of being in an idling state by being supplied with a power supply voltage (power) lower than the power supply voltage (power) in the operation mode, and has a function of shifting to the operation mode or sleep mode in accordance with a command (instruction) given from the outside.

For example, in the multi-CPU 201, if an operation instruction is provided from the CPU for realizing the function of the controller control unit 210 in the sleep mode, the plural CPUs for realizing the functions of the plural RIP modules shift from the sleep mode to the operation mode. On the other hand, if a sleep mode shift instruction is provided from the CPU for realizing the function of the controller control unit 210 in the operation mode, the plural CPUs shift from the operation mode to the sleep mode.

The communication control unit 204 is an interface that controls data communication based on a serial transmission scheme or parallel transmission scheme that is defined between the communication control unit 204 and the controller 100, and performs data communication with the controller 100.

The processing ability, that is, the number of CPUs in the multi-CPU 201 and the storage capacity of the local memory 203, may vary among the individual controller boards 200#1 to 200#N.

The print control device 20 includes a communication control unit 23, which serves as an interface that controls data communication based on a serial transmission scheme or parallel transmission scheme that is defined between the print control device 20 and the plural controller boards 200#1 to 200#N of the print data conversion processing device 10.

Next, a RIP process (print data conversion process) performed by the print data conversion processing device 10 will be described with reference to FIG. 4.

In the controller 100, the print document receiving unit 110 receives a print document (PDL data) to be printed from the host computer 2, stores the print document in the print document storage unit 160 (step S101), and notifies the number-of-pages analyzing unit 120 that the print document has been stored.

The number-of-pages analyzing unit 120 that has received the notification detects the number of pages forming the print document stored in the print document storage unit 160, and notifies the RIP module assignment control unit 130 of the number of pages (step S102).

The RIP module assignment control unit 130 executes "a process of determining the controller boards to be operated and the number of RIP modules", which will be described in detail below, on the basis of the notified number of pages of the print document and the controller configuration information stored in the controller configuration information storage unit 170 (step S103).

The RIP module assignment control unit 130 transfers the print document stored in the print document storage unit 160 to (the controller control units 210 of) the determined controller boards to be operated (step S104), and notifies the page assignment control unit 140 of a result of the "process of determining the controller boards to be operated and the number of RIP modules" performed in step S103, that is, the pieces of information (identification information) representing the controller boards to be operated, the number of RIP modules of each controller board to be operated, and the number of pages of the print document (step S105).

Figure 5:
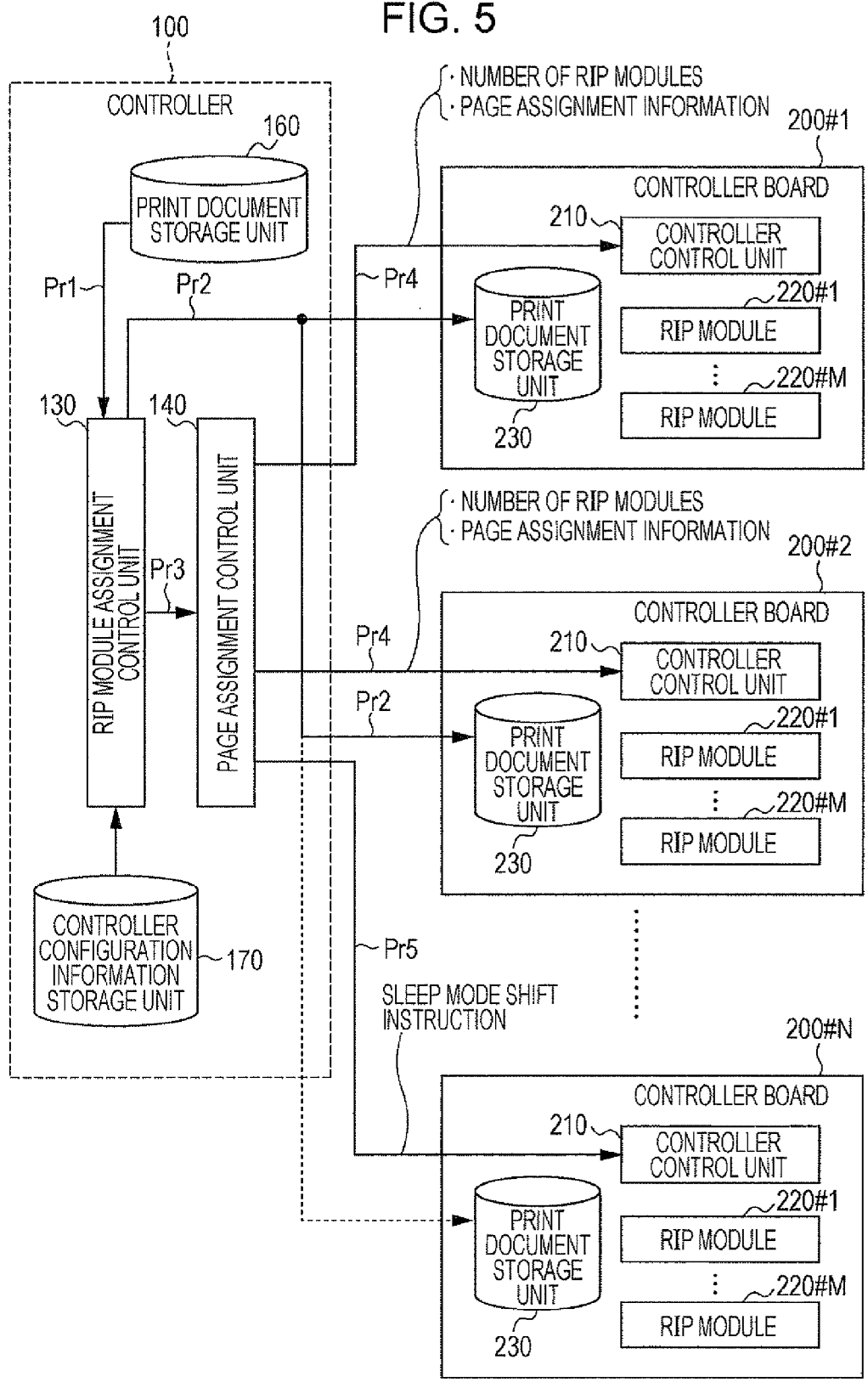
FIG. 5 is a diagram describing a process performed by an RIP module assignment control unit and a page assignment control unit of a controller of the print data conversion processing device according to the exemplary embodiment.

Now, a specific example will be described. As illustrated in FIG. 5, the RIP module assignment control unit 130 reads a print document stored in the print document storage unit 160 (see Pr1) and transfers the read print document to the determined controller boards to be operated (see Pr2). In FIG. 5, the illustration of the print document receiving unit 110, the number-of-pages analyzing unit 120, and the information obtaining unit 150 is omitted.

It is assumed here that, among the plural controller boards 200#1 to 200#N, only the controller board 200#N is determined to be a controller board not to be operated, and the other controller boards (only the controller boards 200#1 and 200#2 are illustrated in FIG. 5) are determined to be controller boards to be operated.

That is, the example illustrated in FIG. 5 shows that the print document is transferred to the controller boards 200#1 and 200#2 that are determined to be operated but the print document is not transferred to the controller board 200#N that is determined not to be operated.

The RIP module assignment control unit 130 notifies the page assignment control unit 140 of the pieces of information (identification information) representing the controller boards 200#1 to 200#(N−1) to be operated, the number of RIP modules of each controller board to be operated, and the number of pages of the print document (see Pr3).

Referring back to FIG. 4, the page assignment control unit 140 executes the "process of determining RIP modules", which will be described in detail below, on the basis of the pieces of information (identification information) representing the controller boards to be operated and the number of RIP modules of each controller board to be operated (step S106). Then, the page assignment control unit 140 outputs the number of RIP modules to be operated, which is a result of this process, and page assignment information based on the notified number of pages of the print document, or a sleep mode shift instruction to the plural controller boards 200#1 to 200#N.

In the example illustrated in FIG. 5, the page assignment control unit 140 outputs the number of RIP modules of each controller board to be operated and page assignment information to the controller boards to be operated (the controller boards 200#1 and 200#2 in FIG. 5) on the basis of the information obtained from the RIP module assignment control unit 130 (see Pr4).

Also, the page assignment control unit 140 outputs a sleep mode shift instruction to the controller board 200#N not to be operated (see Pr5).

Referring back to FIG. 4, in the plural controller boards 200#1 to 200#N, the controller control unit 210 stores the print document transferred in step S104 in the print document storage unit 230, and also executes the "process of operating RIP modules", which will be described in details below, on the basis of the output information from the page assignment control unit 140 (the number of RIP modules to be operated and page assignment information or sleep mode shift instruction) (step S107).

Figure 6:
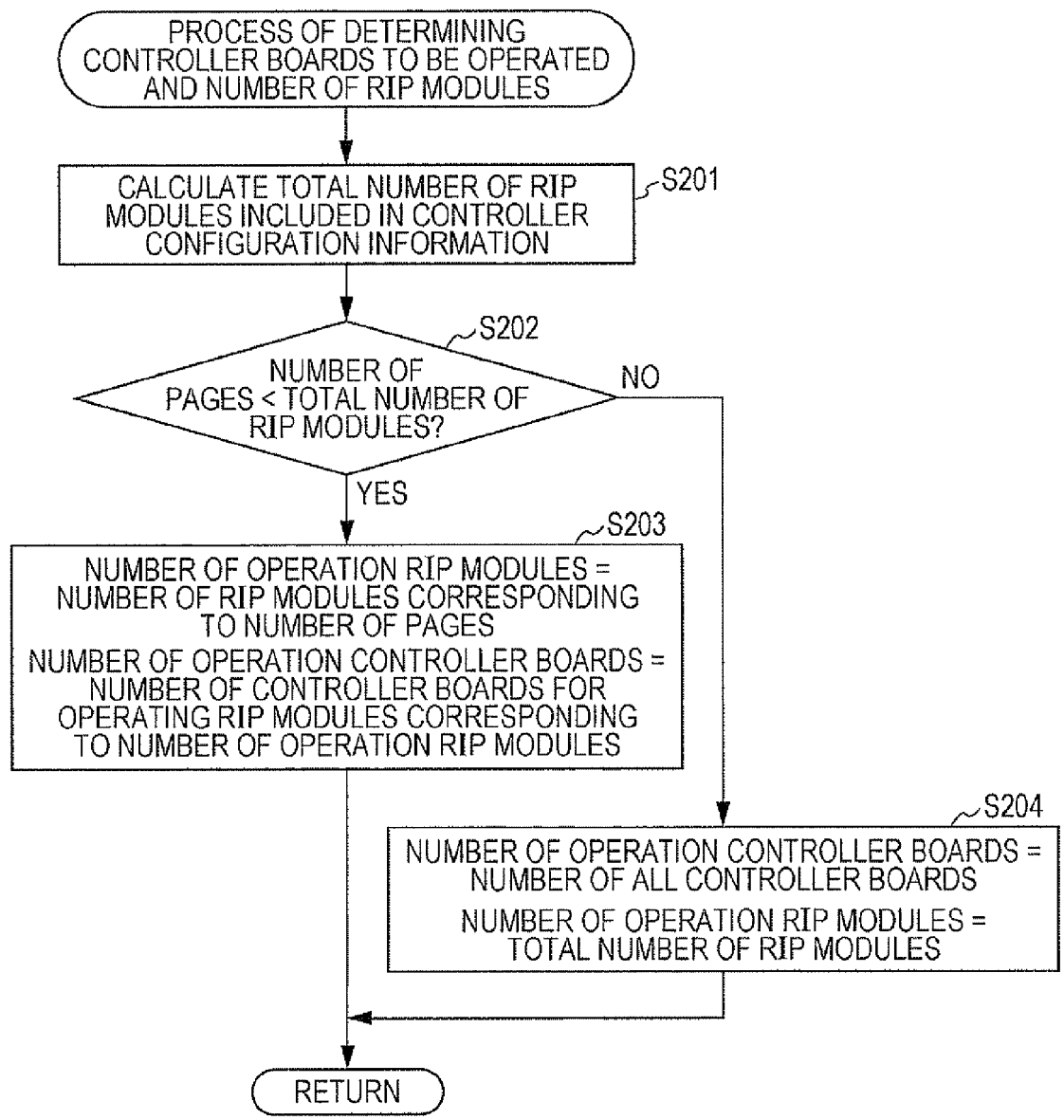
FIG. 6 is a flowchart illustrating a process procedure of a process of determining the number of controller boards and the number of RIP modules performed by the RIP module assignment control unit according to the exemplary embodiment.

Next, the process of determining the controller boards to be operated and the number of RIP modules (the process in step S103 of FIG. 4) performed by the RIP module assignment control unit 130 will be described with reference to FIG. 6.

The RIP module assignment control unit 130 calculates the total number of RIP modules of the controller boards on the basis of the number of RIP modules to be operated on each control board included in the controller configuration information stored in the controller configuration information storage unit 170, that is, the pieces of information (identification information) representing the controller boards, the number of the controller boards, and the number of RIP modules to be operated on each controller board (step S201).

The RIP module assignment control unit 130 judges whether or not the number of pages of the print document notified from the number-of-pages analyzing unit 120 is smaller than the calculated total number of RIP modules (whether or not "the number of pages of the print document<the total number of RIP modules" is satisfied) (step S202).

If the RIP module assignment control unit 130 judges in step S202 that the number of pages of the print document is smaller than the total number of RIP modules calculated in step S201, the RIP module assignment control unit 130 determines that the number of RIP modules to be operated (hereinafter referred to as "the number of operation RIP modules") is equal to the number of RIP modules corresponding to the number of pages of the print document, and also determines that the number of controller boards to be operated (hereinafter referred to as "the number of operation controller boards") is equal to the number of controller boards for operating the RIP modules corresponding to the determined number of operation RIP modules (step S203).

If the RIP module assignment control unit 130 judges in step S202 that the number of pages of the print document is equal to or larger than the total number of RIP modules calculated in step S201, the RIP module assignment control unit 130 determines that the number of operation controller boards is equal to the number of all the controller boards, and also determines that the number of operation RIP modules is equal to the determined total number of RIP modules (step S204).

Figure 4:
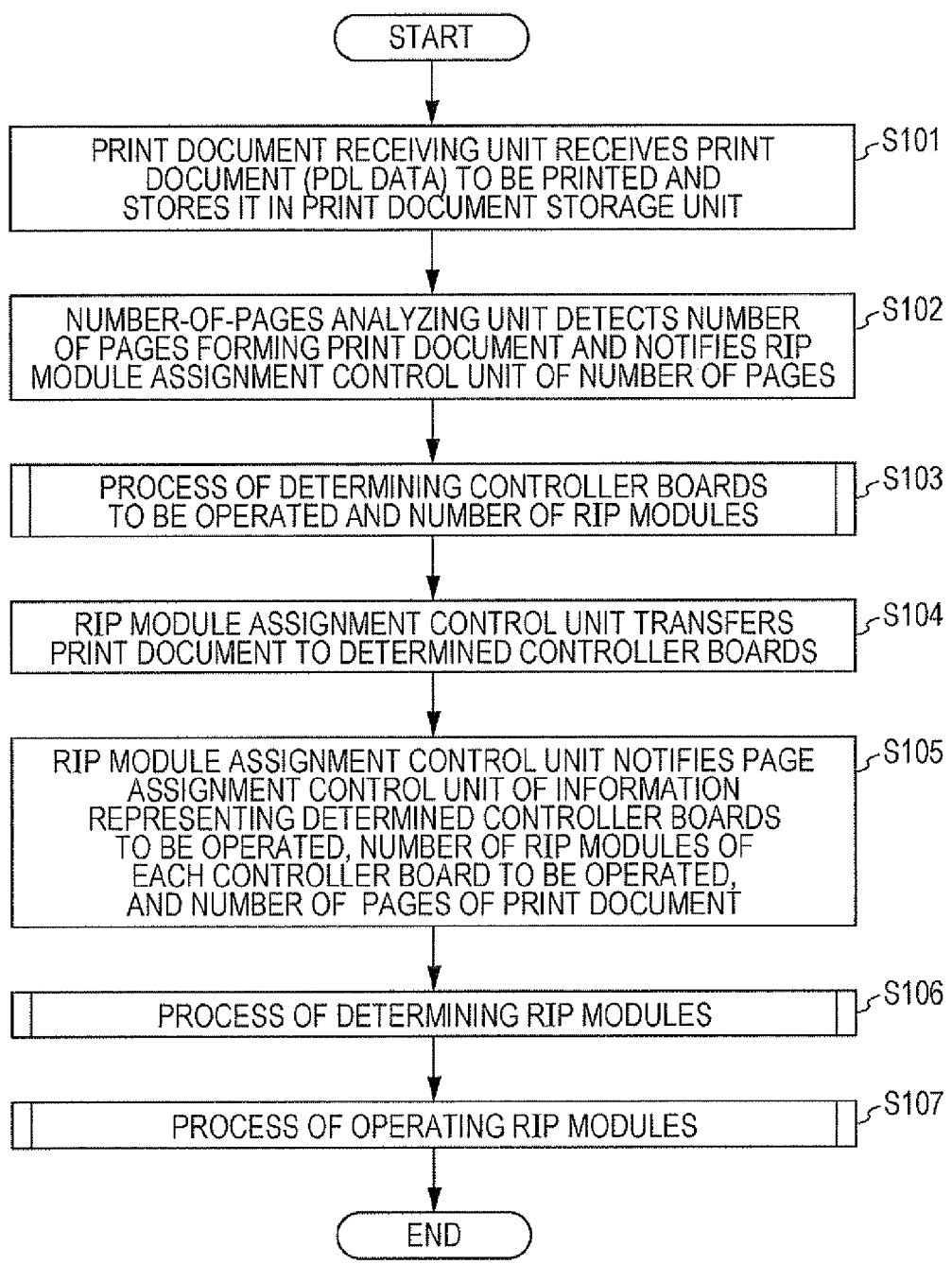
FIG. 4 is a flowchart illustrating a process procedure of a RIP process (print data conversion process) performed by the print data conversion processing device according to the exemplary embodiment.

After completing step S203 or S204, the RIP module assignment control unit 130 ends this process and returns to step S103 of the RIP process (print data conversion process) illustrated in FIG. 4.

That is, the RIP module assignment control unit 130 selects the controller boards for operating the RIP modules from among the plural controller boards 200#1 to 200#N on the basis of the number of pages of the print document and the calculated total number of RIP modules, determines the RIP modules to be operated on the selected controller boards, and performs control so that the RIP modules on a non-selected controller board are not operated.

Figure 7:
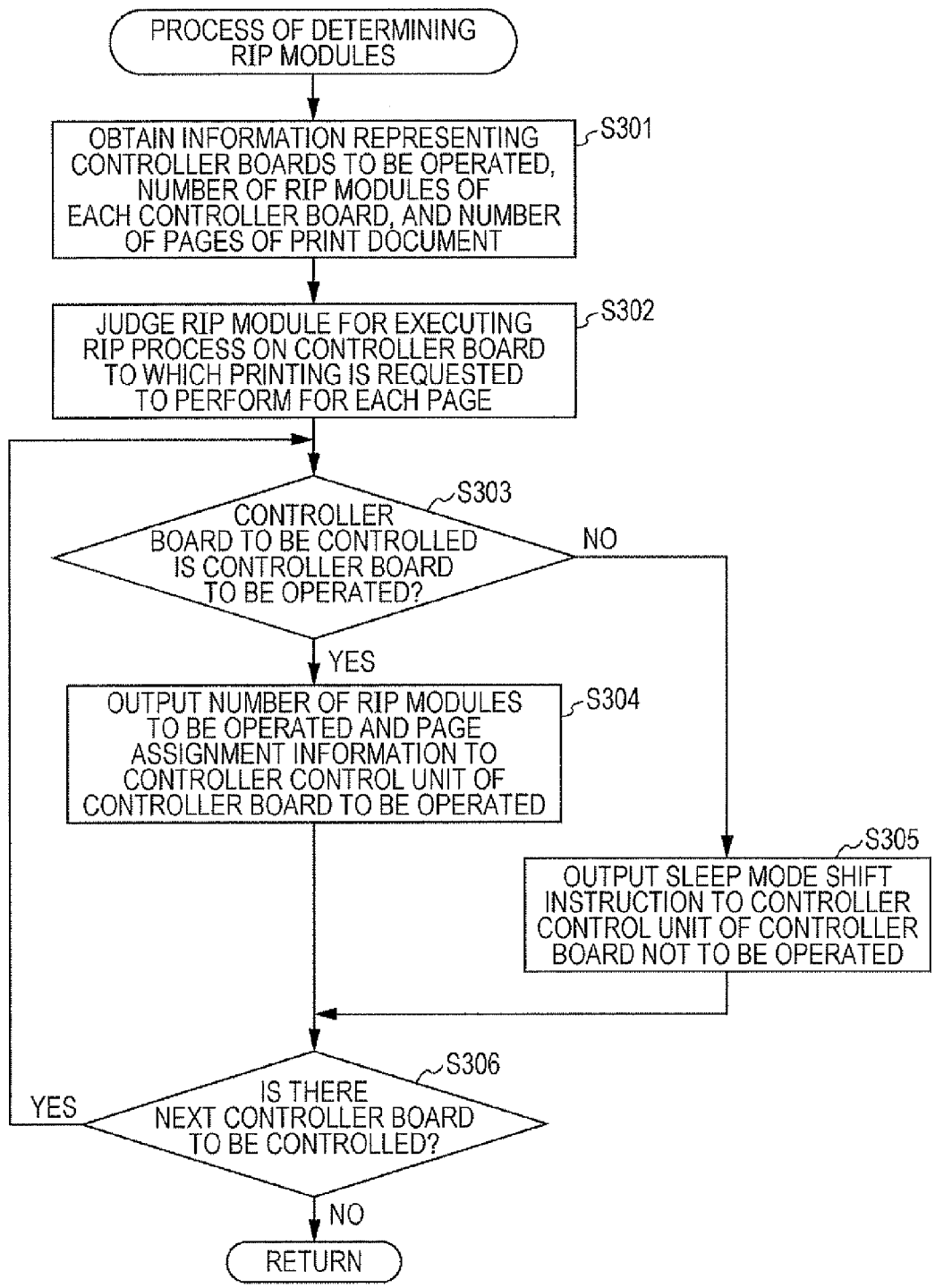
FIG. 7 is a flowchart illustrating a process procedure of a process of determining RIP modules performed by a page assignment control unit according to the exemplary embodiment.

Next, the process of determining RIP modules (step S106 in FIG. 4) performed by the page assignment control unit 140 will be described with reference to FIG. 7.

The page assignment control unit 140 obtains, from the RIP module assignment control unit 130, the pieces of information (identification information) representing the controller boards to be operated, the number of RIP modules of each controller board to be operated, and the number of pages of the print document (step S301).

The page assignment control unit 140 judges, for each print page, which RIP module is to execute the RIP process (print data conversion) on the controller board to which printing is requested to perform among the controller boards to be operated (step S302).

The page assignment control unit 140 judges whether or not a controller board as a target to be controlled is a controller board to be operated on the basis of the obtained pieces of information (identification information) representing the controller boards to be operated, while sequentially regarding the plural controller boards 200#1 to 200#N as a target to be controlled (step S303).

If the page assignment control unit 140 judges in step S303 that the controller board as a target to be controlled is a controller board to be operated, the page assignment control unit 140 outputs the number of RIP modules to be operated and page assignment information (information about the pages to be printed) based on the number of pages of the print document to the controller control unit 210 of the controller board to be operated (step S304).

If the page assignment control unit 140 judges in step S303 that the controller board as a target to be controlled is a controller board not to be operated, the page assignment control unit 140 outputs a sleep mode shift instruction to the controller control unit 210 of the controller board not to be operated (step S305).

After completing step S304 or S305, the page assignment control unit 140 judges whether or not there is the next controller board to be controlled (step S306). If there is the next controller board to be controlled, the process returns to step S303. On the other hand, if there is no next controller board to be controlled (if all the controller boards have been processed as a target to be controlled), the process ends and returns to step S106 in the RIP process (print data conversion process) illustrated in FIG. 4.

Figure 8:
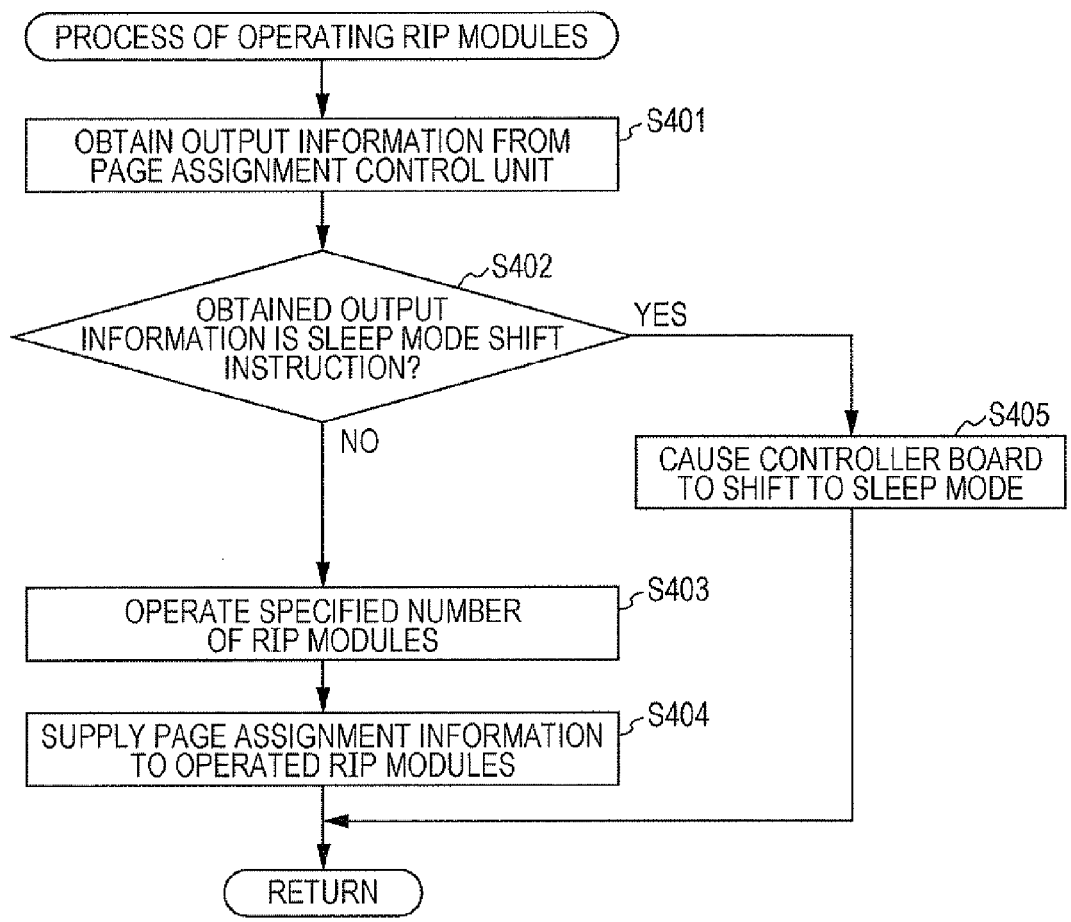
FIG. 8 is a flowchart illustrating a process procedure of a process of operating RIP modules performed by the page assignment control unit according to the exemplary embodiment.

Next, the process of operating RIP modules (step S107 in FIG. 4) performed by the controller control unit 210 of the controller boards will be described with reference to FIG. 8.

The controller control unit 210 obtains output information supplied from the page assignment control unit 140, that is, the number of RIP modules to be operated and page assignment information, or a sleep mode shift instruction (step S401), and judges whether or not the obtained output information is a sleep mode shift instruction (step S402).

If the controller control unit 210 judges in step S402 that the obtained output information is not a sleep mode shift instruction, the controller control unit 210 judges that the output information includes the number of RIP modules to be operated and page assignment information, operates only the specified number of RIP modules (step S403), and then supplies the page assignment information to the operated RIP modules (step S404).

The RIP modules operated in this manner convert the pages that are assigned on the basis of the page assignment information into print data (execute the RIP process).

If the controller control unit 210 judges in step S402 that the obtained output information is a sleep mode shift instruction, the controller control unit 210 causes the controller board to shift to the sleep mode (step S405).

After completing step S404 or S405, the controller control unit 210 ends this process and returns to step S107 in the RIP process (print data conversion process) illustrated in FIG. 4.

Next, the RIP process (print data conversion process) performed by plural RIP modules will be described by using a first specific example.

Here, the following four conditions 1 to 4 are used as preconditions.

(Condition 1) Plural controller boards are constituted by four controller boards 200#1 to 200#4, and each of the controller boards includes two RIP modules 220#1 and 220#2 (see FIG. 9).

(Condition 2) The pieces of information (identification information) representing the respective controller boards 200#1 to 200#4 are ID200#1, ID200#2, ID200#3, and ID200#4. The RIP module assignment control unit 130 and the page assignment control unit 140 output information toward the output destinations (transmission destinations) based on these pieces of identification information, that is, toward the controller boards.

(Condition 3) The number of pages of a print document is four, the pieces of information (identification information) representing the controller boards included in controller configuration information are ID200#1, ID200#2, ID200#3, and ID200#4, the number of controller boards is four, and the number of RIP modules of each controller board is two. Also, the total number of RIP modules is calculated as eight.

(Condition 4) In the multi-CPU 201 of each controller board (see FIG. 3), the CPU for executing the controller control unit 210 constantly operates, and the CPU corresponding to the RIP module 220#1 and the CPU corresponding to the RIP module 220#2 are in the sleep mode until they are operated by the CPU for executing the controller control unit 210.

Under such preconditions, the RIP module assignment control unit 130 judges that "the number of pages of the print document=four" is smaller than "the total number of RIP modules=eight" (judges that "the number of pages of the print document=four<the total number of RIP modules=eight" is satisfied).

The RIP module assignment control unit 130 determines the number of operation RIP modules and the number of operation controller boards in the following manner.

(1) The RIP module assignment control unit 130 determines the number of operation RIP modules to be four, which corresponds to the number of pages of the print document=four. That is, the number of operation RIP modules=four.

(2) The RIP module assignment control unit 130 determines the number of operation controller boards to be the number of controller boards for operating the four operation RIP modules, and the number of controller boards for maximizing the number of controller boards in an idling state among all the controller boards. In this case, since the number of RIP modules of each controller board is two, the number of controller boards for maximizing the number of controller boards in an idling state is two. Thus, the number of operation controller boards is two.

Assume that the RIP module assignment control unit 130 determines, for example, the two controller boards 200#1 and 200#2 as controller boards to be operated on the basis of the number of operation RIP modules=four and the number of operation controller boards=two, which are determined in the above-described manner.

Then, as illustrated in FIG. 9, the RIP module assignment control unit 130 transfers the print document (print document made up of four pages pp. 1 to 4) to the two controller boards 200#1 and 200#2 that have been determined to be operated, and does not transfer the print document to the other two controller boards 200#3 and 200#4 that have been determined not to be operated.

Also, the RIP module assignment control unit 130 outputs, to the page assignment control unit 140, the pieces of information (identification information) ID200#1 to ID200#4 representing all the controller boards, the pieces of information (identification information) ID200#1 and ID200#2 representing the controller boards 200#1 and 200#2 to be operated, the number of RIP modules=two of each controller board obtained on the basis of the number of operation RIP modules=four, and the number of pages of the print document=four.

On the basis of the information obtained from the RIP module assignment control unit 130, the page assignment control unit 140 outputs the pieces of page assignment information p1 and p2 based on the number of RIP modules=two and the number of pages of the print document=four to the controller control unit 210 of the controller board 200#1 corresponding to the piece of information ID200#1 representing the controller board to be operated, and also outputs the pieces of page assignment information p3 and p4 based on the number of RIP modules=two and the number of pages of the print document=four to the controller control unit 210 of the controller board 200#2 corresponding to the piece of information ID200#2 representing the controller board to be operated (see FIG. 9).

Accordingly, the controller control unit 210 of the controller board 200#1 operates the RIP modules 220#1 and 220#2, and supplies the piece of page assignment information p1 to the operated RIP module 220#1, and the piece of page assignment information p2 to the RIP module 220#2, as illustrated in FIG. 9.

Specifically, in the multi-CPU 201 of the controller board 200#1 (FIG. 3), the CPU that executes the controller control unit 210 operates the CPU in the sleep mode that executes the RIP module 220#1 and the CPU in the sleep mode that executes the RIP module 220#2, and supplies the corresponding piece of page assignment information to each of the operated CPUs.

Also, in the controller board 200#2, as in the controller board 200#1, the RIP modules 220#1 and 220#2 are operated by the controller control unit 210 and are then supplied with the pieces of page assignment information p3 and p4, respectively.

Specifically, in the multi-CPU 201 of the controller board 200#2 (see FIG. 3), as in the controller board 200#1, the CPU that executes the controller control unit 210 provides an operation instruction to the CPU in the sleep mode that executes the RIP module 220#1 and the CPU in the sleep mode that executes the RIP module 220#2 (operates the individual CPUs), and supplies the corresponding piece of page assignment information to each of the operated CPUs.

On the other hand, the page assignment control unit 140 outputs, on the basis of the information obtained from the RIP module assignment control unit 130, a sleep mode shift instruction to the controller control units 210 of the controller boards 200#3 and 200#4 corresponding the pieces of information ID200#3 and ID200#4 representing the controller boards not to be operated (see FIG. 9).

Accordingly, the controller control unit 210 of the controller board 200#3 causes the controller board 200#3 to shift to the sleep mode, and the controller control unit 210 of the controller board 200#4 causes the controller board 200#4 to shift to the sleep mode.

Specifically, in the multi-CPU 201 of the controller board 200#3, the CPU that executes the controller control unit 210 causes the CPU in the sleep mode that executes the RIP module 220#1 and the CPU in the sleep mode that executes the RIP module 220#2 to be kept in the sleep mode. In other words, the CPU that executes the controller control unit 210 performs nothing on the RIP modules 220#1 and 220#2 that are already in the sleep mode.

Also, in the controller board 200#4, as in the controller board 200#3, the CPU that executes the controller control unit 210 causes the CPU that executes the RIP module 220#1 and the CPU that executes the RIP module 220#2 to shift to the sleep mode.

As described above, in the first specific example, the controller control unit 210 performs control so that the RIP modules 220#1 and RIP modules 220#2 of the controller boards 200#3 and 200#4, which have been determined not to be operated by the RIP module assignment control unit 130, are not operated.

Therefore, in the multi-CPUs 201 of the controller boards 200#3 and 200#4, the two CPUs that execute the RIP modules 220#1 and 220#2 shift to the sleep mode, and thus the power consumption is suppressed.

As described above, in the print data conversion processing device 10, in the case of executing a RIP process for converting a print document having a number of pages smaller than the number of RIP modules into raster data, the conversion process time (RIP process time) for the print document having the small number of pages decreases, and the power consumption is suppressed.

Next, the RIP process (print data conversion process) performed by plural RIP modules will be described by using a second specific example.

In the above-described first specific example, the RIP module assignment control unit 130 determines the number of operation controller boards to be two, in which the number of controller boards in an idling state is maximized. Alternatively, the following method may be used instead.

That is, under the four preconditions described above with reference to FIG. 9, the RIP module assignment control unit 130 may determine the number of controller boards corresponding to the number of operation RIP modules=four, which is determined in the above-described manner, to be the number of operation controller boards.

Specifically, assume that the RIP module assignment control unit 130 determines four controller boards 200#1, 200#2, 200#3, and 200#4 to be controller boards that are to be operated, on the basis of the number of operation RIP modules=four and the number of operation controller boards=four determined in the above-described manner.

Then, the RIP module assignment control unit 130 transfers a print document (print document made up of four pages pp. 1 to 4) to the four controller boards 200#1, 200#2, 200#3, and 200#4, as illustrated in FIG. 10.

Also, the RIP module assignment control unit 130 outputs, to the page assignment control unit 140, the pieces of information (identification information) ID200#1 to ID200#4 representing all the controller boards, the pieces of information (identification information) ID200#1, ID200#2, ID200#3, and ID200#4 representing the controller boards 200#1, 200#2, 200#3, and 200#4 to be operated, the number of RIP modules one of each controller board, which is obtained on the basis of the number of operation RIP modules=four, and the number of pages of the print document=four.

On the basis of the information obtained from the RIP module assignment control unit 130, the page assignment control unit 140 outputs the piece of page assignment information p1 based on the number of RIP modules=one and the number of pages of the print document=four, to the controller control unit 210 of the controller board 200#1 corresponding to the piece of information ID200#1 representing the controller board to be operated (see FIG. 10).

Accordingly, as illustrated in FIG. 10, the controller control unit 210 of the controller board 200#1 operates the RIP module 220#1 and supplies the piece of page assignment information p1 to the operated RIP module 220#1. Also, the controller control unit 210 of the controller board 200#1 outputs a sleep mode shift instruction to the RIP module 220#2.

Specifically, in the multi-CPU 201 of the controller board 200#1, the CPU that executes the controller control unit 210 provides an operation instruction to the CPU in the sleep mode that executes the RIP module 220#1 (operates the CPU), and supplies page assignment information to the operated CPU. Also, the CPU that executes the controller control unit 210 causes the CPU in the sleep mode that executes the RIP module 220#2 to be kept in the sleep mode (perform nothing).

Also, as in the case of the controller board 200#1, the page assignment control unit 140 outputs, to the controller control units 210 of the controller boards 200#2, 200#3, and 200#4 corresponding to the pieces of information ID200#2, ID200#3, and ID200#4 representing the controller boards to be operated, the pieces of page assignment information p2, p3, and p4 based on the number of RIP modules=one and the number of pages of the print document=four, on the basis of the information obtained from the RIP module assignment control unit 130 (see FIG. 10).

Accordingly, the controller control units 210 of the controller boards 200#2, 200#3, and 200#4 operate the RIP modules 220#1, respectively, and supply the pieces of page assignment information p2, p3, and p4 to the operated RIP modules 220#1, respectively, as illustrated in FIG. 10. Also, the controller control units 210 of the controller boards 200#2, 200#3, and 200#4 output a sleep mode shift instruction to the RIP modules 220#2.

Specifically, in the multi-CPUs 201 of the individual controller boards 200#2, 200#3, and 200#4, as in the case of the controller board 200#1, the CPU that executes the controller control unit 210 provides an operation instruction to the CPU in the sleep mode that executes the RIP module 220#1 (operates the CPU), and supplies page assignment information to the operated CPU. Also, the CPU that executes the controller control unit 210 causes the CPU in the sleep mode that executes the RIP module 220#2 to be kept in the sleep mode (perform nothing).

As described above, in the second specific example, the effect of suppressing the power consumption decreases compared to the first specific example, but the power consumption is suppressed compared to the case of not executing the RIP process according to the second specific example.

Next, the RIP process (print data conversion process) performed by plural RIP modules will be described by using a third specific example.

Here, regarding condition 3 among the preconditions used in the first specific example, the number of print pages is changed from four to eight. There is no change for the other conditions.

Under such preconditions, the RIP module assignment control unit 130 judges that the number of pages of the print document=eight is equal to the total number of RIP modules=eight (judges that "the number of pages of the print document=eight<the total number of RIP modules=eight" is not satisfied).

Therefore, the RIP module assignment control unit 130 determines the number of operation RIP modules to be eight, which corresponds to the number of pages of the print document, and determines the number of operation controller boards to be four in order to operate the eight operation RIP modules.

Then, the RIP module assignment control unit 130 transfers the print document (print document made up of eight pages pp. 1 to 8) to the four controller boards 200#1, 200#2, 200#3, and 200#4, as illustrated in FIG. 11.

Also, the RIP module assignment control unit 130 outputs, to the page assignment control unit 140, the pieces of information (identification information) ID200#1 to ID200#4 representing all the controller boards, the pieces of information (identification information) ID200#1 to ID200#4 representing the controller boards 200#1 to 200#4 to be operated, the number of RIP modules=two of each controller board, which is obtained on the basis of the number of operation RIP modules=eight, and the number of pages of the print document=eight.

On the basis of the information obtained from the RIP module assignment control unit 130, the page assignment control unit 140 outputs page assignment information about corresponding two pages based on the number of RIP modules two and the number of pages of the print document=eight, to the controller control units 210 of the controller boards 200#1, 200#2, 200#3, and 200#4 corresponding to the piece of information ID200#1, ID200#2, ID200#3, and ID200#4 representing the controller boards to be operated (see FIG. 11).

Accordingly, as illustrated in FIG. 11, the controller control units 210 of the controller boards 200#1 to 200#4 operate the RIP modules 220#1 and 220#2 and supply the page assignment information to the operated RIP modules 220#1 and 220#2.

Specifically, in the controller boards 200#1 to 200#4, the same process as in the case of the controller board 200#1 according to the first specific example is performed. That is, the CPU that executes the controller control unit 210 provides an operation instruction to the CPU in the sleep mode that executes the RIP module 220#1 and the CPU in the sleep mode that executes the RIP module 220#2 (operates the individual CPUs), and supplies the corresponding piece of page assignment information to the operated CPUs.

Next, the RIP process (print data conversion process) performed by plural RIP modules will be described by using a fourth specific example.

In the above-described first specific example, the RIP module assignment control unit 130 determines the number of operation controller boards to be two so as to maximize the number of controller boards in an idling state.
Alternatively, the following method may be used instead.

That is, under the preconditions according to the first specific example, the RIP module assignment control unit 130 recognizes that, on the basis of the number of pages of the print document=four and the number of RIP modules of each controller board=two, the number of pages=four is an integral multiple of the number of RIP modules=two, that is, twice in this case. Then, the RIP module assignment control unit 130 determines the number of RIP modules=two to be the number of operation RIP modules.

Subsequently, the RIP module assignment control unit 130 judges that one controller board is enough to operate the two RIP modules corresponding to the determined number of operation RIP modules, and determines that the number of operation controller boards=one. In this case, a maximum number of controller boards in an idling state among all the controller boards is determined to be three.

The RIP module assignment control unit 130 determines one controller board 200#1 as a controller board to be operated on the basis of the number of operation RIP modules=two and the number of operation controller boards=one, which are determined in the above-described manner.

Then, the RIP module assignment control unit 130 transfers the print document (print document made up of four pages pp. 1 to 4) to the controller board 200#1, which has been determined to be operated, but does not transfer the print document to the other three controller boards 200#2, 200#3, and 200#4, which have been determined not to be operated.

Also, the RIP module assignment control unit 130 outputs, to the page assignment control unit 140, the pieces of information (identification information) ID200#1 to ID200#4 representing all the controller boards, the piece of information (identification information) ID200#1 representing the controller board 200#1 to be operated, the number of RIP modules of the controller board=two, which is obtained on the basis of the number of operation RIP modules=two, and the number of pages of the print document=four.

On the basis of the information obtained from the RIP module assignment control unit 130, the page assignment control unit 140 outputs the number of RIP modules=two and the pieces of page assignment information p1, p2, p3, and p4 based on the number of pages of the print document to the controller control unit 210 of the controller board 200#1 corresponding to the piece of information ID200#1 representing the controller board to be operated.

Accordingly, the controller control unit 210 of the controller board 200#1 operates the RIP modules 220#1 and 220#2, and supplies the pieces of page assignment information p1 and p2 to the operated RIP module 220#1 and supplies the pieces of page assignment information p3 and p4 to the operated RIP module 220#2.

Specifically, in the multi-CPU 201 of the controller board 200#1 (see FIG. 3), the CPU that executes the controller control unit 210 operates the CPU in the sleep mode that executes the RIP module 220#1 and the CPU in the sleep mode that executes the RIP module 220#2, and supplies the corresponding piece of page assignment information to the individual operated CPUs.

On the other hand, the page assignment control unit 140 outputs a sleep mode shift instruction to the controller control units 210 of the controller boards 200#2, 200#3, and 200#4 corresponding to the pieces of information ID200#2, ID200#3, and ID200#4 representing the controller boards not to be operated, on the basis of the information obtained from the RIP module assignment control unit 130. In this case, a process similar to that in the case of the controller board 200#3 in the first specific example is performed.

As described above in the fourth specific example, according to this exemplary embodiment, the number of RIP modules to be operated on controller boards may be smaller than the number of pages of a print document, in the case of limiting the number of controller boards to be operated on the basis of the number of pages of the print document and the controller configuration information.

In this case, the number of pages of the print document exceeds the maximum number of RIP modules in the case of causing operation controller boards to simultaneously perform parallel processing, and thus a situation occurs in which a single RIP module sequentially processes plural pages.

Even in such a case, the time necessary for converting a print document into print data, that is, a conversion process time (RIP process time), may not decrease for the following reasons.

(1) In the case of transferring a print document in advance, the print document may be transferred to only determined controller boards. Thus, overhead caused by wasted time for transferring the print document to controller boards that are not determined (not used) is suppressed.

(2) In the case of operating plural RIP modules on a controller board, a cache hit rate increases when various cache mechanisms (font, form, etc.) in a RIP module or among RIP modules are used. Accordingly, in a controller board that sequentially processes plural pages, the efficiency of converting pages of a print document into print data increases.

As described above, according to this exemplary embodiment, in the case of converting a print document of a short job into print data, at least in the case of converting a print document having a number of pages smaller than the total sum of the maximum numbers of RIP modules of respective controller boards into print data (in the cases of the first and second specific examples), control is performed to operate only plural RIP modules corresponding to the number of pages among the total number of RIP modules and not to operate the other RIP modules.

Therefore, the CPUs that execute the RIP modules not to be operated shift to the sleep mode, and accordingly the amount of power supply, in other words power consumption, is suppressed compared to the case of the operation mode. In this exemplary embodiment, a print document having a number of pages smaller than the total number of RIP modules is used as an example of a short job. Alternatively, whether or not a print document is a short job may be judged on the basis of a predetermined value.

Furthermore, according to this exemplary embodiment, in the case of converting the above-described print document of a short job into print data (in the case of the first specific example), the controller boards for operating RIP modules are determined from among plural controller boards in view of the RIP processing ability (the number of CPUs and the storage capacity of a memory) of the individual controller boards, and control is performed to operate only the plural RIP modules on the determined controller boards and not to operate the plural RIP modules on the other controller boards.

Therefore, the plural CPUs that execute the plural RIP modules controlled not to be operated on the other controller boards shift to the sleep mode, and accordingly the amount of power supply, in other words power consumption, is suppressed compared to the case of the operation mode.

Particularly, in a print data conversion processing device configured to be added with controller boards, unnecessary power consumption is further suppressed and more economical operation is performed as the number of added controller boards is larger and the number of RIP modules is larger, in the case of printing the above-described print document of a short job.

The invention made by the inventor has been described in detail in accordance with an exemplary embodiment. The exemplary embodiment disclosed in this specification is an example in every viewpoint and is not limited to the disclosed technology. That is, the technical scope of the invention is not to be interpreted in a limited manner on the basis of the description of the exemplary embodiment and should be defined by the following claims. The technical scope of the invention includes all modifications without deviating from the following claims and their equivalents, and the gist of the claims.

In the case of using a program, the program may be provided via a network or may be provided by being stored in a storage medium, such as a compact disc read only memory (CD-ROM).

That is, the program may be provided in the manner described below without recording the program in a storage device (secondary storage device), such as a hard disk.

For example, the program may be stored in a ROM, and a CPU may load the program from the ROM to a storage device and execute the program.

Alternatively, the program may be stored in a computer-readable storage medium, such as a digital versatile disc ROM (DVD-ROM), a CD-ROM, a magneto-optical (MO) disc, or a flexible disk, and may be distributed.

Furthermore, an image processing device or the like may be connected to a server device or a host computer via a communication line (e.g., the Internet), the program may be downloaded from the server device or the host computer, and then the program may be executed. In this case, the program may be downloaded to a memory, such as a RAM, or a storage device (storage medium), such as a hard disk.

The image output apparatus including the image processing device according to the exemplary embodiment of the present invention may be applied to an image output apparatus that uses toner for recording, and to an inkjet image output apparatus that performs recording using ejected ink.

What is claimed is:

1. An image processing device comprising:
a plurality of conversion units that convert a print document into raster data;
a plurality of control boards, each having the plurality of conversion units;
a determination unit that determines the number of conversion units to be operated on the basis of the number of pages of an obtained print document; and
a control unit that performs control so that only conversion units corresponding to the number determined by the determination unit among the plurality of conversion units are operated so as to maximize the number of control boards in an idling state among the plurality of control boards.

2. The image processing device according to claim 1, wherein the determination unit determines the number of conversion units to be operated, the number corresponding to the number of pages of the print document.

3. An image output apparatus comprising:
the image processing device according to claim 1; and
an execution unit that executes image formation on the basis of raster data that is converted by the conversion units of the image processing device.

4. A non-transitory computer readable medium storing a program causing a computer to execute a process comprising:
converting a print document into raster data using a plurality of conversion units, wherein a plurality of control boards each have the plurality of conversion units;
determining the number of conversion units to be operated on the basis of the number of pages of an obtained print document; and
performing control so that only conversion units corresponding to the determined number among the plurality of conversion units are operated so as to maximize the number of control boards in an idling state among the plurality of control boards.

* * * * *